United States Patent [19]

Morikawa et al.

[11] Patent Number: 4,692,107

[45] Date of Patent: Sep. 8, 1987

[54] APPARATUS FOR CONTINUOUSLY PRODUCING AT A FLOW RATE A STRIP OF DOUGH OF CONSTANT DIMENSIONS

[75] Inventors: Michio Morikawa; Torahiko Hayashi, both of Utsunomiya, Japan

[73] Assignee: Rheon Automatic Machinery Co., Ltd., Japan

[21] Appl. No.: 838,338

[22] Filed: Mar. 11, 1986

[30] Foreign Application Priority Data

Mar. 12, 1985 [JP] Japan .................................. 60-49108

[51] Int. Cl.$^4$ .............................................. C01G 1/00
[52] U.S. Cl. ..................................... 425/140; 425/145; 425/371; 425/373; 425/335
[58] Field of Search ............... 425/140, 101, 335, 145, 425/371, 373, 147

[56] References Cited

U.S. PATENT DOCUMENTS

| | | | |
|---|---|---|---|
| 4,056,346 | 11/1977 | Hayashi | 425/101 |
| 4,398,877 | 8/1983 | Taylor | 425/145 |
| 4,448,736 | 5/1984 | Emery et al. | 425/145 |
| 4,583,930 | 4/1986 | Hayashi | 425/371 |

*Primary Examiner*—Bernard Nozick
*Attorney, Agent, or Firm*—Finnegan, Henderson, Farabow, Garrett & Dunner

[57] ABSTRACT

An apparatus for continuously producing a strip of dough which is quantified in its flow rate and controlled in its dimensions while the dough is conveyed. The apparatus comprises a dough feed conveyor having a weighing device, a constant speed conveyor provided thereon a dough defining means, and a roller mechanism disposed over both the two conveyors and having an endless roller pass with a straight portion facing the conveyors. The dough fed between the roller mechanism and the two conveyors is thickened or stretched in response to the speed difference of the two conveyors, so as to be made a dough strip of uniform thickness and width, without imparting the stirring force to the dough.

3 Claims, 4 Drawing Figures

4,692,107

APPARATUS FOR CONTINUOUSLY PRODUCING AT A FLOW RATE A STRIP OF DOUGH OF CONSTANT DIMENSIONS

BACKGROUND OF THE INVENTION

1. Field of the Invention

The present invention relates to an apparatus for continuously producing a strip of dough of constant dimensions at a constant flow rate while the dough is conveyed, and more particularly, to such apparatus whereby a pressure or stirring force imparted to the dough is minimized, and the width and thickness of the dough strip is made uniform.

2. Description of Prior Art

Continuous feeding of a dough having elasticity and viscosity, such as bread dough has hitherto been carried out through extrusion by a screw apparatus, or through suction and extrusion by an extruder with a piston and a cylinder.

These apparatus, however, basically rely upon mechanical forces to form continuous dough strips. An excessive pressure is frequently imparted to the dough fed, or the dough is frequently severed by the screw during stirring.

Such mechanical forces harm the dough structure, especially bread dough. The gel structure of the dough tends to be destroyed due to the pressure or stirring, and an extra step is required to recover the gel structure. Such a step required an extra device, and thus the size of the dough processing apparatus becomes bulky.

The inventor of the present invention invented the apparatus disclosed in (U.S. patent application Ser. No. 718,126 filed on Apr. 1, 1985), in which a variable speed conveyor having a weighing device and a constant speed conveyor arranged downstream of and adjacent to the variable speed conveyor is provided, and two pressing means are disposed above and adjacent the rear end of the variable speed conveyor and the front end of the constant speed conveyor, respectively. The dough is compressed or stretched between two positions where the pressing means are disposed to be made into dough having a constant unit weight.

Furthermore, the inventor invented an apparatus for producing a strip of dough having constant dimensions and a constant flow rate, disclosed in (U.S. patent application Ser. No. 720,760 filed on Apr. 8, 1985 now U.S. Pat. No. 4,583,930), in which a roller mechanism replaced the pressing means disposed above and adjacent the front end of the constant speed conveyor in the apparatus of the first-mentioned patent application.

In the latter patent application, dough defining means was further provided between the straight portion of the roller mechanism and the conveyance path of the constant speed conveyor, and the dough is similarly compressed or stretched between two positions, namely between the portion where the pressing means above the rear end of the variable speed conveyor are located and the position where the dough comes into contact with the roller mechanism.

In either apparatus of these two inventions, although the dough fed between the two positions is effectively compressed by the increased speed of the variable conveyor when the weight of dough per unit length on the variable speed conveyor is smaller than a predetermined value, the dough can not be uniformly stretched when the weight of dough per unit length is larger than the predetermined value.

The dough between the pressing means and the variable speed conveyor is controlled in a region where the pressing means abuts the dough, and, only the dough portion in or near the region can be directly controlled by the pressing means so as to move together with the movement of the pressing means, but, the dough portion leaving the region is not effectively controlled by the pressing means.

Therefore, if there is a relatively thinner portion in the dough, only that portion of dough is stretched, whereby the thinner portion of dough would become thinner. This phenomenon demonstrates that stress is liable to converge on the thinner portion when the dough is stretched.

SUMMARY OF THE INVENTION

It is an object of the present invention to provide an apparatus for continuously producing at a constant flow rate a strip of dough of constant dimensions while the dough is conveyed.

It is another object of the present invention to provide an apparatus for continuously and accurately producing at a constant flow rate a strip of dough of constant dimensions.

In one aspect of the present invention, an apparatus for continuously producing at a constant flow rate a strip of dough of constant dimensions is provided, which comprises, a variable speed conveyor for feeding dough, a dough weighing device continuously measuring the weight of each portion of the dough conveyed past the weighing device, the weighing device being located between the opposite ends of the conveyance path of the conveyor, a constant speed conveyor arranged downstream of and adjacent to the variable speed conveyor, a control unit for controlling the speed of the variable speed conveyor at a speed inversely proportional to the weight of a dough portion measured by the dough weighing device, dough defining means positioned on the conveyance path of the constant speed conveyor, and dough holding means including a roller mechanism to hold the dough at portions on the variable speed conveyor and on the constant speed conveyor, characterized by a roller mechanism comprising a plurality of rollers rotatable about their axes and movable along a path including a straight portion above the conveyors, the straight portion of the roller path being positioned over both the variable speed conveyor and the constant speed conveyor, thereby holding the dough fed between the roller mechanism and the conveyors to produce the strip of dough of constant dimensions.

The apparatus for producing a strip of dough according to the present invention comprises a variable speed conveyor which is driven at a variable speed in response to weight measurements of dough fed onto the conveyor and provided with a dough weighing device, a constant speed conveyor which is arranged adjacent the variable speed conveyor and is driven at a constant speed and also at a speed higher than the variable speed conveyor, and on the conveyance path of which dough defining means is positioned to restrict the width of dough, and a roller mechanism including a plurality of rollers movable along a path having a straight portion.

The straight portion of the roller path is located over both the variable speed conveyor and the constant speed conveyor. The dough fed between the roller mechanism and conveyors is uniformly thickened or stretched in response to the weight measured by a weighing device located between the opposite ends of the conveyance path of the variable speed conveyor, to make a strip of dough at a constant flow rate.

Since the straight portion of the roller path uniformly holds the dough, the speed difference between the two conveyors effectively causes the dough between the two conveyors to be evenly stretched.

In other words, the roller mechanism causes the dough to uniformly engage the belts of the two conveyors, effectively thickening or stretching it so as to carry out the accurate quantifying of the flow rate of the dough.

DESCRIPTION OF THE PREFERRED EMBODIMENT

A first embodiment of the present invention will now be described by reference to the drawings.

Figure 1:
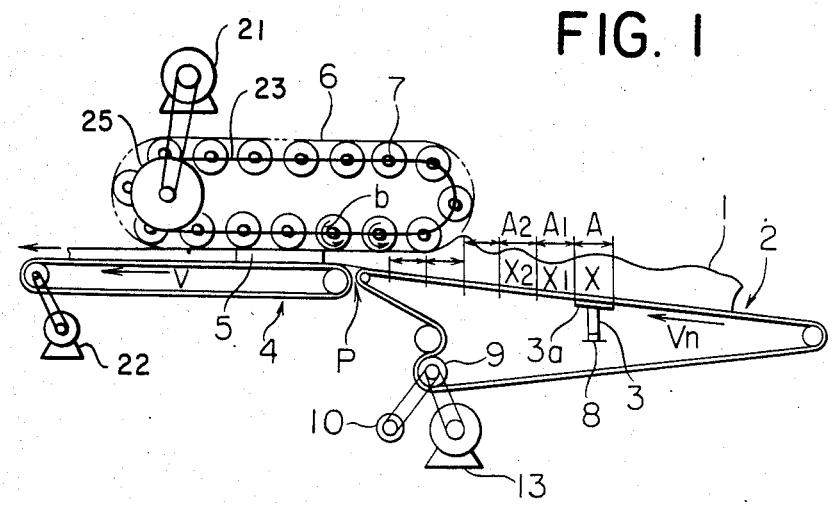
FIG. 1 is a schematic side elevation view of a first embodiment of the present invention.
Figure 2:
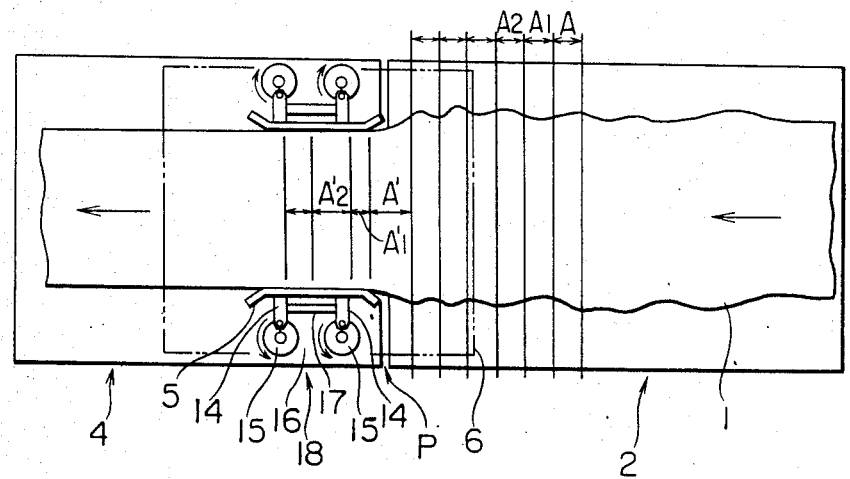
FIG. 2 is a schematic plan view of the first embodiment of the present invention.

In FIG. 1, the apparatus of the present invention is schematically illustrated. A dough feed conveyor 2 is positioned at the upstream end of the apparatus and has a top flat flight, which is slightly inclined, increasing its height in the downstream direction. The dough feed conveyor 2 is driven at a variable speed Vn by a driven roller 9 which is operated by a motor 13. A rotation transducer 10 is operatively associated with the driven roller 9 and functions to generate pulses indicative of the length of movement of a belt of the dough feed conveyor 2. A weighing device 3 disposed under the belt of the dough feed conveyor 2 in such a manner that a weighing table 3a of the weighing device 3 is located underneath the belt, and generates from a load sensor 8 signals showing the weight X of a portion of dough passing over the weighing table 3a.

A constant speed conveyor 4 is arranged downstream of and adjacent the dough feed conveyor 2 and has a horizontally positioned flat top flight. It is driven by a drive unit 22 at a constant speed V, which speed is higher than that of the dough feed conveyor 2.

Dough defining means 18 are disposed on the upper flight or the conveyance path of the constant speed conveyor 4, and comprises a crank mechanism 16 and defining plates 5, the defining plate 5 is supported by rods 14 which are connected by a connecting rod 17. The outermost end of each rod 14 is rotatably mounted on a peripheral portion of each of discs 15, the shafts of which are mounted on the frame of the apparatus, and the discs 15 are adapted to rotate by a drive unit (not shown).

The defining plates 5, when the discs 15 rotate as shown by arrowes, can make a swinging motion while staying parallel to the moving direction of the dough 1.

A roller mechanism 6 is disposed over both the two conveyors 2 and 4 as shown in FIG. 1. The roller mechanism comprises a plurality of rollers 7 which are adapted to move by chains 23, which connect shaft of the rollers 7 at their outer ends, and which are moved by a sprocket 25 being rotated by a drive unit 21 along an oval circuit including a straight portion facing the conveyors, each of the rollers being caused to be rotated about their own axes by the friction with the dough, as shown by an arrow "b". The straight portion of the roller mechanism overlaps the dough feed conveyor 2 in a length of about 50 to 200 mm, and concurrently overlaps the front end area of the constant speed conveyor 4 in a length of about 50 to 300 mm. The overlapped region may be either longer or shorter than the aforesaid distance. The length of the overlapped region depends on the physical properties of the material to be quantified, for instance, elasticity, viscosity, or consisting.

The operation of the first embodiment according to the present invention will now be described. The dough, charged on the dough feed conveyor 2 is passed on the weighing table 3a, and its weight Xn is continuously measured by every unit length A, such as $X_1$, and $X_2$ for $X_1$ and $X_2$, respectively. The relationship between a desired reference weight value $X_R$ per unit time, that is, a desired flow rate of dough, the measured dough weight Xn per unit length A and the speed Vn of the dough feed conveyor 2 is expressed as follows:

$$V \cdot X_R = X_n \cdot V_n = \text{Constant}$$

where V is the speed of the constant speed conveyor 4.

Therefore, the speed Vn should be calculated from the following formula:

$$V_n = (V \cdot X_R)/(X_n)$$

Accordingly, with respect to a dough portion having a measured weight $X_1$, the following formula can be applied:

$$V_1 = (V \cdot X_R)/(X_1)$$

where V is the speed at which the dough feed conveyor 2 should be run when a dough portion with a measured weight $X_1$ reaches the rear end P of the conveyor 2. It is a speed at which the constant flow rate of dough would be attained.

Figure 3:
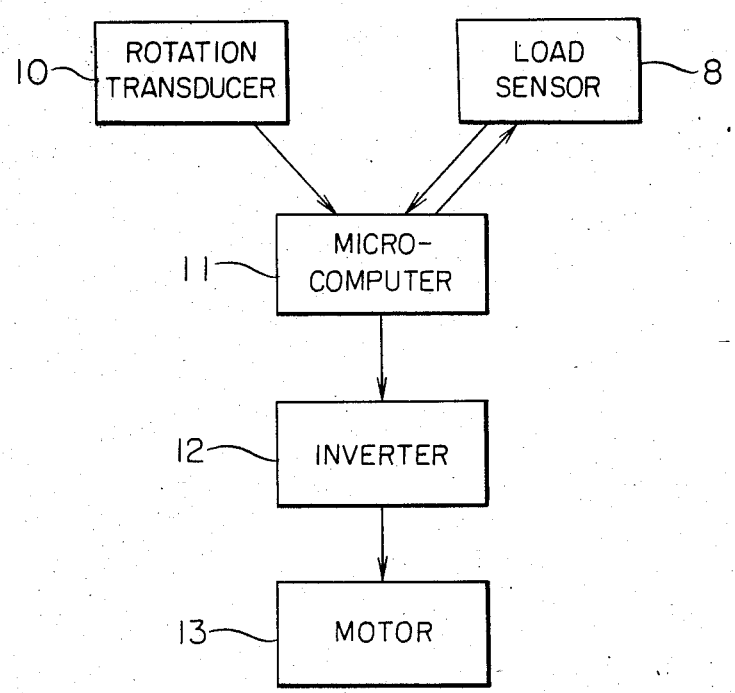
FIG. 3 is a block diagram of a control unit showing its main components.

The transducer 10 generates pulses indicative of the length of the movement of the belt of the dough feed conveyor 2, and transmits them to the microcomputer 11, as shown in FIG. 3. The microcomputer 11 then sends signals to the load sensor 8 to cause it to weigh the dough. Signals indicative of the weight of the dough are sent to the microcomputer 11, which stores this information and calculates the speed $V_1$ of the dough feed conveyor 2 in accordance with the formula, and transmits signals, through an inverter 12, to the motor 13 to operate it when the corresponding dough portion reaches the rear end P of the dough feed conveyor 2. Thus, the motor 12 is driven at the speed $V_1$ inversely proportional to the weight $X_1$, so that the corresponding dough portion is then thickened or stretched by the difference of speed between the two conveyors and the holding action of the roller mechanism stretching over the two conveyors.

Thus, each dough portion having its weight measurements $X_1$, $X_2$... is thickened or stretched between the rear end P of the dough feed conveyor 2 and the front end of the constant speed conveyor 4 in accordance with the speeds $V_1$, $V_2$... namely, speeds inversely proportional to the weight of each portion of the dough.

The width of the thus produced dough is then adjusted by the dough defining means 18, namely, by the defining plates 5 so as to make it uniform throughout the dough strip.

In the first embodiment of the present invention, the direction of movement of the rollers 7 along the conveyance path is the same as that of the dough, but the similar flat holding action can also be imparted even when the rollers 7 are moved in the reverse direction.

In the first embodiment of the present invention, the endless roller mechanism is used, however, a roller mechanism having a straight roller path may also be used. This roller mechanism may consist of a plurality of rollers mounted horizontally on connecting arms on each side so as to provide a straight roller path and arranged to freely rotate about their axes. The rotation of the roller may be restricted by their engagement with a friction plate mounted on the frame of the apparatus. The roller mechanism is driven by a drive mechanism to move back and forth on the dough surface. By arranging the roller mechanism above both the dough feed conveyor 2 and the constant speed conveyor 4, and causing the connecting arms to move back and forth, the rollers engaging the material over the two conveyors effectively thicken or stretch the material, thereby attaining the desired quantification of the flow rate and the uniform dimensions of the material.

Figure 4:
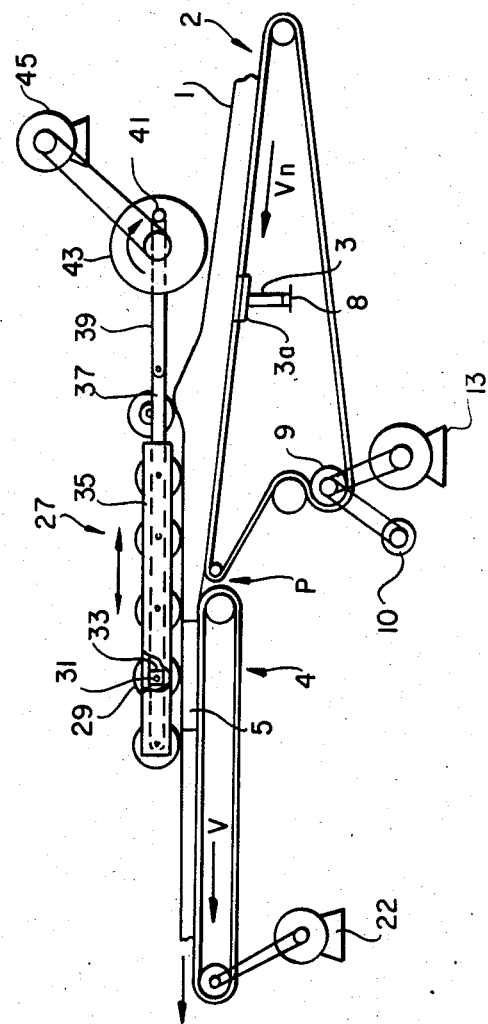
FIG. 4 is a schematic side elevational view of a second embodiment of the invention.

In a second embodiment, as shown in FIG. 4, a roller mechanism 27 is mounted above the conveyors 2 and 4 in place of the endless roller mechanism 6 employed in the first embodiment. A plurality of rollers 29 are arranged in parallel, and adapted to freely rotate about their shafts 31 which are fixedly connected to sliding members 33, which can slide within grooves (not shown) provided inside roller frames 35. The shafts 31 are fixedly connected to a pair of connecting arms 37 in the vicinity of each end of the rollers 29. The connecting arms 37 is a plate horizontally disposed, and it has holes to receive the shafts 31. The connecting arms 37 at both ends of the rollers are rotatably connected to one end of each of a pair of crank arms 39. The other end of each of the crank arms 39 is rotatably connected by means of a pin 41 to a point near the circumference of one of a pair of discs 43. The discs 43 are adapted to rotate through a chain by a drive unit 45. When the drive unit 45 is energized, the rollers 29 move back and forth repeatedly.

We claim:

1. An apparatus for continuously producing at a constant flow rate of a strip of daugh of constant dimensions comprising:
    a variable speed conveyor for feeding dough,
    a dough weighing device continuously measuring the weight of each portion of the dough conveyed past the weighing device, the weighing device being located between the opposite ends of the conveyance path of the conveyor,
    a constant speed conveyor arranged downstream of and adjacent to the variable speed conveyor,
    a control unit for controlling the speed of the variable speed conveyor at a speed inversely proportional to the weight of a dough portion measured by the dough weighing device,
    dough defining means positioned on the conveyance path of the constant speed conveyor to define the outer sides of the dough, and
    dough holding means including a roller mechanism to hold the dough at portions on the variable speed conveyor and on the constant speed conveyor,
    said roller mechanism comprising a plurality of rollers rotatable about their axes and movable along a path including a straight portion above the conveyors,
    the straight portion of the roller path being positioned over both the variable speed conveyor and the constant speed conveyor, thereby holding the dough fed between the roller mechanism and the conveyors to produce the strip of dough of constant dimensions.

2. An apparatus of claim 1, wherein the roller mechanism has freely-rotatable rollers arranged along an endless roller path, the peripheries of the moving rollers forming a closed envelope, the rollers being adapted to progress along the path while rotating themselves when in contact with the dough.

3. An apparatus of claim 1, wherein the roller mechanism has freely-rotatable rollers arranged on a straight roller path and the rollers are adapted to move back and forth by drive means.

* * * * *